United States Patent
Handler

[11] Patent Number: 5,613,517
[45] Date of Patent: Mar. 25, 1997

[54] SHEATH VALVE

[75] Inventor: Michael D. Handler, Brookfield, Conn.

[73] Assignee: Reseal International Limited Partnership, New York, N.Y.

[21] Appl. No.: 327,608

[22] Filed: Oct. 24, 1994

[51] Int. Cl.⁶ ..................................................... F16K 15/14
[52] U.S. Cl. ......................................... 137/512.4; 137/859
[58] Field of Search ........................ 137/851, 859, 137/512.4

[56] References Cited

U.S. PATENT DOCUMENTS

| | | | |
|---|---|---|---|
| 2,376,712 | 5/1945 | Moran | 137/859 X |
| 2,629,399 | 2/1953 | Kulick | 137/859 X |
| 2,943,643 | 7/1960 | Pinter | 137/859 X |
| 3,528,342 | 9/1970 | Simcock | 137/859 X |
| 4,355,639 | 10/1982 | DiSalvo | 137/859 X |
| 4,421,510 | 12/1983 | Ahlbeck | 137/859 X |
| 4,646,781 | 3/1987 | McIntyre | 137/859 X |
| 4,846,810 | 7/1989 | Gerber | 604/247 |
| 5,092,855 | 3/1992 | Pardes | 604/247 |
| 5,279,330 | 1/1994 | Debush | 137/853 |
| 5,305,783 | 4/1994 | Debush | 137/853 |
| 5,305,786 | 4/1994 | Debush | 137/512.3 |

FOREIGN PATENT DOCUMENTS 966255  10/1950  France ............................ 137/859

*Primary Examiner*—John Rivell
*Attorney, Agent, or Firm*—Anderson Kill & Olick P.C.

[57] ABSTRACT

A linear sheath valve having a valve platform and a conforming cover. The valve platform can have inlet and outlet channels to carry liquid into and out of the valve. An elastomeric membrane is held under tension between the cover and the valve platform so as to control the flow of liquid between channels. The cover includes an expansion area on the cover surface adjacent to the membrane and between the inlet and outlet. Liquid can flow through the valve only when it is under sufficient pressure to press the membrane into the expansion area, creating a flow path from the inlet between the membrane and the valve platform and to the outlet. Discontinuance of the pressure on the liquid allows the membrane to seal the inlet and outlet, thus preventing any flow between them.

26 Claims, 5 Drawing Sheets

SHEATH VALVE

FIELD OF THE INVENTION

This invention relates to sheath valves, i.e., valves which preferentially control the dierction of flow of liquid. In particular, it relates to a sheath valve which uses a tensioned planar sheath, rather than a cylindrical sheath.

BACKGROUND OF THE INVENTION

A sheath valve is a type of "one-way" valve which permits a liquid, gas, or other flowable material to be dispensed preferentially in one direction, but does not permit backflow through the valve during or upon cessation of dispensing, and so prevents possible contamination to the contents remaining in the dispensing container.

One form of one-way valve is a cylindrical core encompassed by an elastic cylindrical sheath, with the core having an entrance tube therein leading to a portion of the sheath, and an exit tube leading from the sheath. The two tubes are closed by the sheath and do not interconnect; but pressure applied to the liquid being dispensed serves to expand the sheath so that the liquid can pass from the entrance tube to the exit tube. Upon release of the pressure, the sheath contracts, sealing the valve against any possible reverse contamination.

Various patents have issued directed to this cylindrical valve. Examples of these include Gerber U.S. Pat. No. 4,846,810; Debush Pat. Nos. 5,279,330; 5,305,783; and 5,305,786; and Pardes U.S. Pat. No. 5,092,855. Each of these uses a cylindrical sheath surrounding a cylindrical valve core. This cylindrical structure is not only difficult and costly to manufacture, but also difficult and costly to assemble. A problem with a cylindrical sheath valve is that, to maintain tension, the inside diameter of the cylindrical sheath should be smaller in diameter than the outside diameter of the core, resulting in difficult assembly.

This present invention is directed to a sheath structure using a planar elastomeric membrane which is simpler and cheaper to manufacture, but provides an effective preferential flow valve that prohibits non-coerced backflow contamination.

BRIEF SUMMARY OF THE INVENTION

My invention uses inexpensive flat, elastic sheath material held in tension over a convex surface, that is, a surface which is wholly or partly curved or distended along at least one axis of a valve platform, which surface I refer to as a valve platform having a convex surface. There are entrance and exit channels and ports in the valve platform connecting with the interface between the sheath and the valve platform. It is important that the sheath be in tension over this surface, in order to provide a tight, seal for the channels. The valve can control flow of various types of flowable products, such as liquids, pastes, and gases, referred to herein as "liquids."

The various embodiments include as elements (a) a valve platform with a convex surface; (b) a sheath which can be a flat elastic sheet prepared from roll stock, a preformed injection, or compression molded component; and (c) a housing component or cover for sheath protection and retention, the cover and valve platform being sealed together.

There are several key elements to my invention:

First, is the surface of the valve platform that is the functional area in terms of barrier and closure, the sheath being in tension over the surface of the sheath where it interfaces with the valve platform. This platform can take a variety of shapes, ranging from a dome to one-half of an elongated cylinder. The key consideration is the natural lay and stretch of the sheath when placed in tension, and its tight contact and interface with the valve platform.

Second, is the number and configuration of entrance and exit ports and channels that function to channel liquid flow within the context of the valve.

Third, are the mechanisms for anchoring the sheath to the platform. These anchor mechanisms can take various forms, but each uses a cover piece which sandwiches the edges of the sheath between the platform and the cover piece; and each provides for spacing between the cover piece and the platform in the area where the ports interface with the sheath, i.e., an expansion chamber, so that the sheath can expand under pressure to permit fluid flow between the ports.

DETAILED DESCRIPTION OF THE INVENTION

Figure 1:
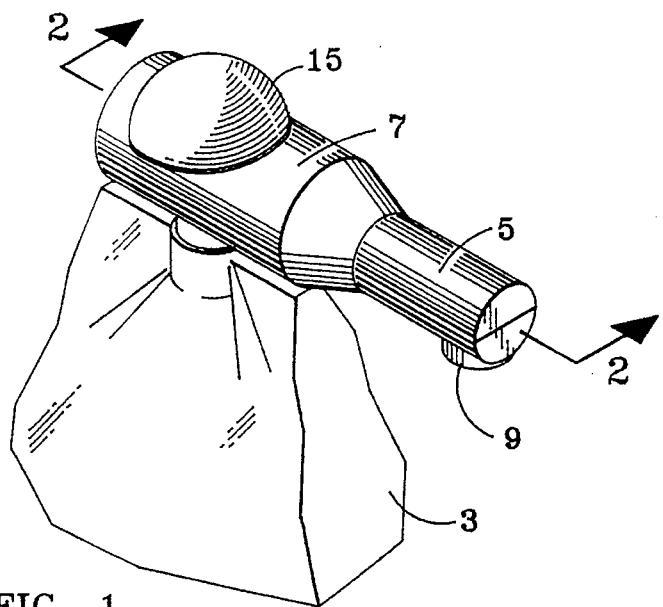
FIG. 1 is a perspective view of a dispenser of the type which might use the sheath valve of this invention.

A typical installation 1 in which my sheath valve could be used is shown in FIG. 1. Collapsible container 3 contains liquid to be dispensed, which is also the liquid the user wants to be sure not to inadvertently contaminate by back-flow from or through a dispenser. A dispenser nozzle 5 having a housing 7 and outlet 9 is mounted on the container 3.

Figure 2:
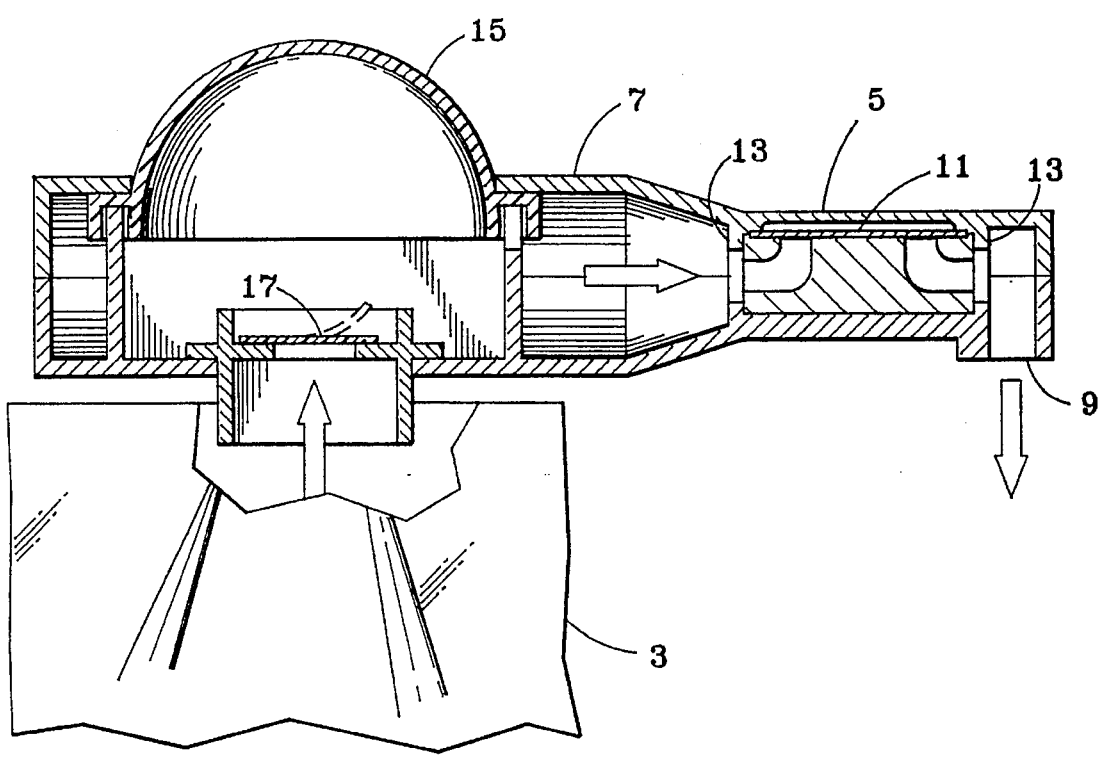
FIG. 2 is a section, taken on line 2—2 of FIG. 1, showing how the valve can be used in a dispenser.
Figure 3:
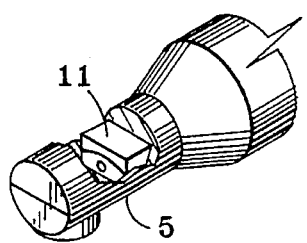
FIG. 3 is a perspective view, partially broken away, of the valve mounted within a spout, such as the spout of FIG. 2.

A sheath valve 11, positioned and sealed by mounting ribs 13, is positioned within housing 7 near the outlet 9 (FIG. 2). A pump, having a flexible, depressible ball 15, and a flapper check valve 17, interconnects the container 3 with the housing 7. Pressure on ball 15 closes valve 17 and, so, forces liquid which is within the housing 7 out through the sheath valve 11. Release of pressure on ball 15 results in the ball resuming its normal round shape; and, in so doing, it draws liquid up from container 3. Simultaneously, the sheath valve resumes the normal, sealed configuration. The liquid can then be forced out through the sheath valve during the next cycle.

For reasons to be described below, it is important to note that the liquid which is being dispensed must be forced under pressure through sheath valve 11.

The sheath valve of this invention is a planar valve, that is, its sheath (elastomeric membrane) is not cylindrical, but is made of material which is either sheet material or essentially planar. The parts of the sheath valve are seen in FIGS. 4–7. They include: A cover 21 having an inner concave surface 22, surface 22 having a peripheral cover shoulder 25 for sealing; a core or valve platform 33 with an inner convex surface 34, complementary to concave surface 22, and a peripheral seat 35 to receive and mate with cover shoulder 25; and a substantially planar elastomeric sheet membrane 29, which is positioned between concave surface 22 and convex surface 34, and is held in tension against convex surface 34. Here, the interface of the two surfaces has a configuration which is a portion of a cylinder, i.e., arcuate.

Figure 4:
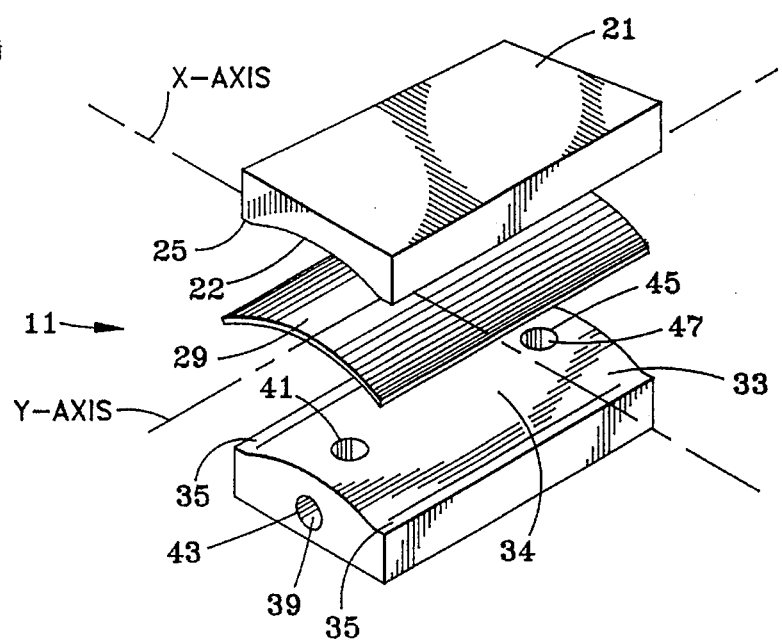
FIG. 4 is an exploded perspective view of a sheath valve. This valve has a generally rectangular shape. It shows the X- and Y-axes referred to below.
Figure 5:
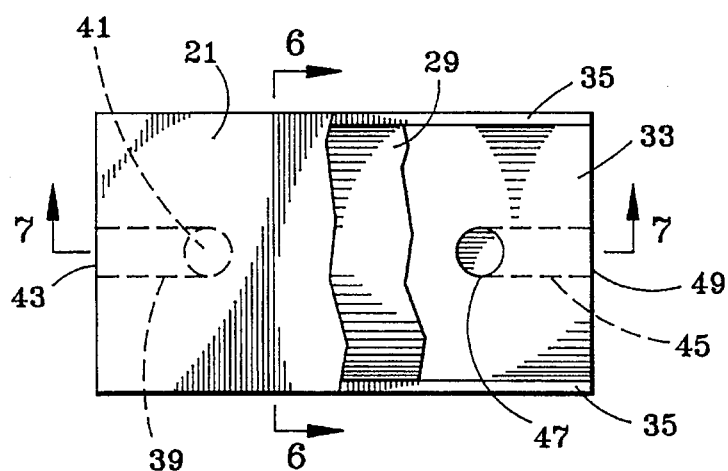
FIG. 5 is a top plan view, partially broken away, of the valve of FIG. 4.
Figure 6:
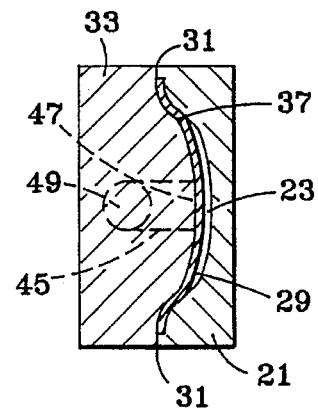
FIG. 6 is a section, taken on line 6—6 of FIG. 5, showing the inner construction of the valve.
Figure 7:
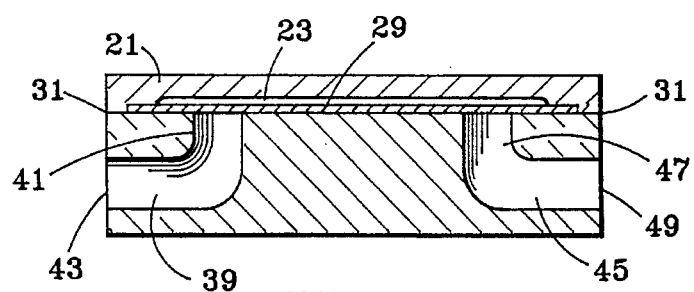
FIG. 7 is a section, taken on line 7—7 of FIG. 5, showing further details of the construction.

One way to make the sheath valve illustrated in FIG. 4 is as follows: An elastic membrane 29, larger in size than the valve platform or cover, is held in a planar format with tension applied in at least the X-axis direction, as indicated in FIG. 4. The convex surface of valve platform 33, and the concave surface of cover 21, are then positioned in alignment above and below membrane 29. The platform and cover are pressed together, clamping membrane 29 (FIG. 6), and putting the appropriate amount of tension into membrane 29 as it is stretched across convex surface 34.

With the application of ultrasonics, membrane 29 is cut, and platform seat 35 is welded to cover shoulder 25 around the entire periphery, creating a hermetic seal.

Figure 10:
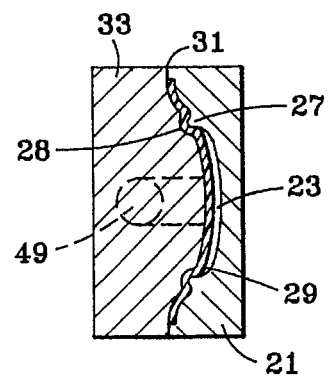
FIG. 10 is a section, taken on line 10—10 of FIG. 9, showing the inner construction of the valve.
Figure 12:
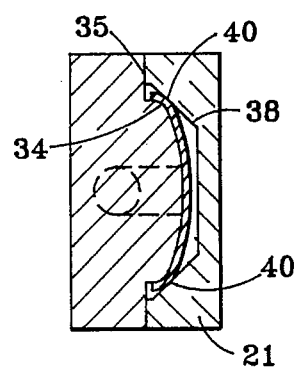
FIG. 12 is similar to FIG. 10, but shows a modification of the structure of FIGS. 9, 10, and 11.
Figure 13:
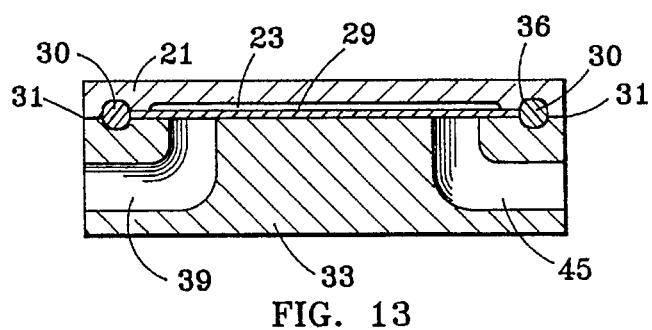
FIG. 13 is similar to FIG. 10, but shows a modification of the structure of FIGS. 9, 10, and 11.

In other embodiments, as shown in FIGS. 10, 12, and 13, membrane 29 can be pre-cut or pre-formed, positioned, and clamped, with the tension on membrane 29 being applied during the mating process of the valve platform and cover. Further, in these embodiments, the process of sealing the platform and cover together can be achieved with adhesives, ultrasonics, or other means.

Returning to FIGS. 4–7, inlet channel 39 in valve platform 33 has an inlet channel 39 with container end 43 and sheath end 41. This channel leads from a source of liquid to sheath end 41 which is closed by taut membrane 29. Valve platform 33 also has outlet channel 45 with sheath end 47 and outlet or user end 49. Sheath end 47 of this channel is closed by taut membrane 29.

Surface 22 includes a recess or expansion chamber 23. Thus, though the periphery of the elastomeric membrane is fitted tightly against convex surface 34, holding sheath ends 41 and 47 closed, the membrane can expand under liquid pressure into expansion area 23. The liquid under pressure comes from inlet channel 39 and presses the membrane 29 into the expansion area, and so provides a channel along convex surface 34, beneath membrane 29, between sheath end 41 of inlet channel 39 and sheath end 47 of outlet channel 45.

Accordingly, when liquid is forced under pressure into inlet channel 39, it presses against the elastomeric membrane 29, pressing it into expansion chamber 23, and so creates a channel between the membrane 29 and convex surface 34, running from inlet sheath end 41 and outlet sheath end 47. As soon as the pressure on the liquid ceases, the membrane again presses against channel ends 41 and 47, closing and sealing them. This means that the valve is closed, and nothing can pass backwards from outlet channel 45 to inlet channel 39. The valve 11 is, then, a one-way valve, and contaminants cannot pass from the outside back into container 3, the source of the liquid being dispensed. Thus, during dispensing, and upon cessation of dispensing, the preferential flow caused by the pressure on the liquid, in conjunction with the structure of valve 11, prohibits back-flow and possible contamination of the liquid in the container 3. In addition, during stagnant times, when no liquid is being dispensed, the valve inhibits non-coerced (i.e., airborne) contamination.

As can be seen from the above, an effective one-way sheath valve has been made using a valve platform and a planar membrane, which is far easier to manufacture than is one having a cylindrical core and a cylindrical sheath. This is so because, in order to maintain tension on the cylindrical unit, one must use a sheath having an inner diameter smaller than the outer diameter of the cylindrical core.

Figure 8:
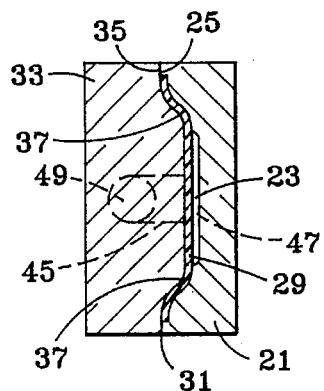
FIG. 8 is similar to FIG. 6, showing a modification of the linear valve.

FIG. 8 shows a slight modification of my sheath valve. Here, the portions of the two inner surfaces 22 and 34 proximate to the expansion chamber 23, are flat, but the surfaces curve downwardly as they approach cover shoulder 25 and valve platform seat 35. This produces an effective convex surface for the membrane, so that it is stretched taut, closing the inlet and outlet channels.

Figure 9:
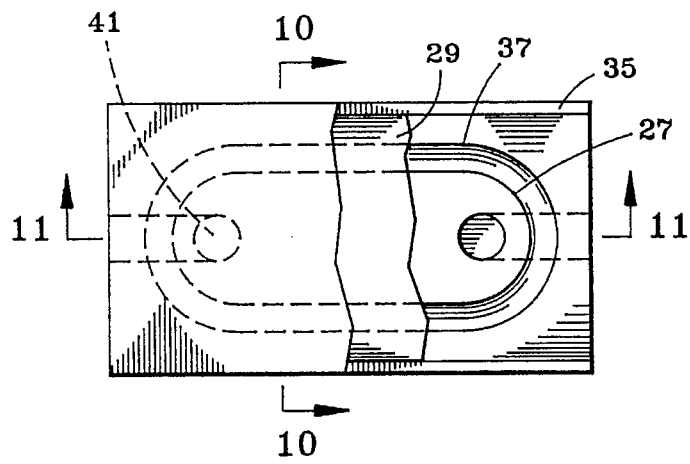
FIG. 9 is a plan view, partially broken away, showing a modification of the valve in which at least the functional area of the valve platform is elliptical in shape.
Figure 11:
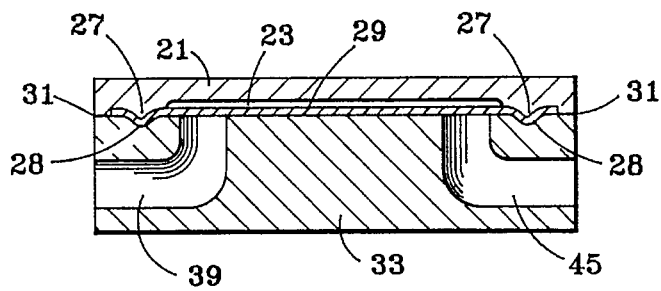
FIG. 11 is a section, taken on line 11—11 of FIG. 9, showing further details of the construction.

Another modification is shown in FIGS. 9, 10, and 11. Rather than have the two inner surfaces rectangular in top view configuration (such as in FIG. 5), they are elliptical. They function, however, in the same manner as the previously-described valves.

FIGS. 10 and 11 show a modification of the clamp area (shoulder). As opposed to the planar clamp 37 shown in FIGS. 6, 7, and 8, FIG. 10 shows a distinct point of pressure, bead or ridge 27 in cover 21, with a matching complementary recess 28 in the platform. Pressing cover 21 against valve platform 33 serves to apply tension to membrane 29.

FIG. 12 shows another modification of clamp area 37. Here, the mechanism is to have the surface 34 curve downwardly as it approaches platform seat 35, while the cover clamp area has an angled, linear cross-section 38, creating a conical-like configuration. Thus, the membrane is clamped by a point line of contact 40 around the surface 34 of the valve platform. In this structure, it is best to have greater friction between cover 21 and membrane 40 than between membrane 40 and platform 33. Alternatively, the membrane 29 can have a bead 30.

Figure 16:
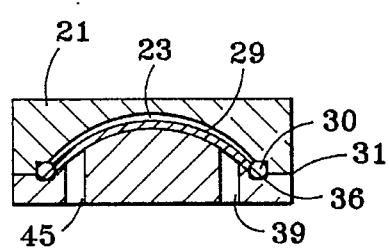
FIG. 16 is similar to FIG. 15, but shows a modification of the valve of FIG. 15.

FIG. 13 is a further modification. Here, the elastomeric membrane 29 has been molded to be a modified sheet. The membrane has a peripheral bead 30 which fits into complementary recesses 36 in the cover 21 and the valve platform 33. This provides for an even tighter seal and wider range of assembly methods. The membrane is made taut, and held taut, however, by stretching over a convex valve platform surface 34, as the cover and platform are pressed together, forcing the bead 30 into recesses 36. FIG. 16 is similar, except there the recess 36 is only in the valve platform.

Figure 14:
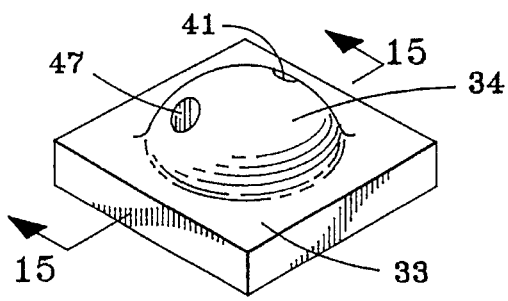
FIG. 14 is a perspective view of a further modification of the valve, in which the functional area of the valve platform is dome-shaped or partially spherical-shaped. It shows only the valve platform.
Figure 15:
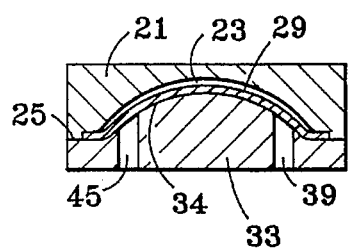
FIG. 15 is a section, taken on line 15—15 of FIG. 14, to which a cover and a sheath have been added, showing the inner construction of this modified valve.

Another modification is shown in FIGS. 14 and 15. Here, the convex valve platform surface 34 is dome-shaped (hemispherical shaped). A modification of this is also seen in FIG. 16.

Figure 17:
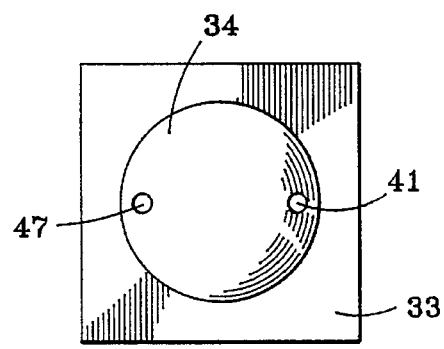
FIG. 17 is a top view of FIG. 14.
Figure 18:
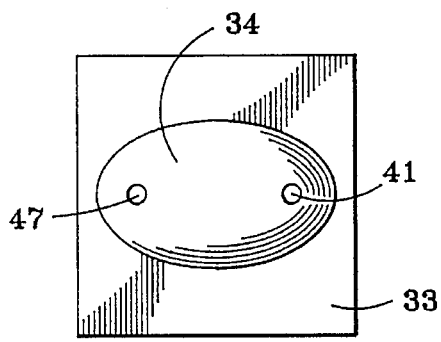
FIG. 18 is a modification of the structure of FIG. 17, showing an oval-shaped periphery.
Figure 19:
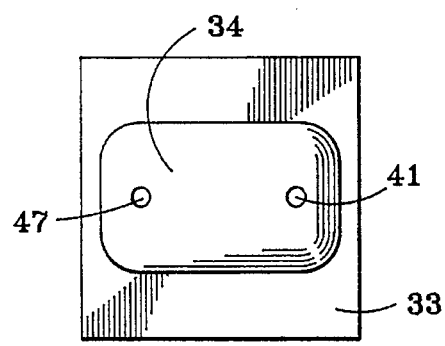
FIG. 19 is a modification of the structure of FIG. 17, showing another type of generally rectilinear-shaped periphery with rounded corners.
Figure 20:
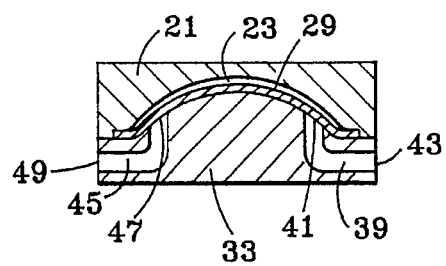
FIGS. 20, 21, 22, and 24 are similar to FIG. 15, showing modifications of the structure of FIG. 15.
Figure 21:
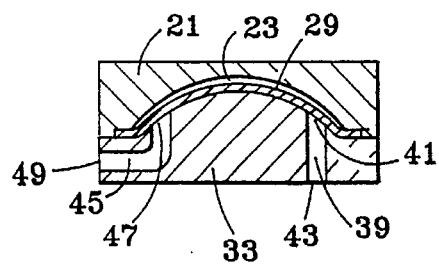

FIGS. 17, 18, and 19 show modifications to the peripheral shape of platform functional area 34. The cross-section of the sheath valve can include linear, domed, partially curved, and elliptical segments and configurations as appropriate to providing membrane tension and the anchoring mechanism.

Figure 24:
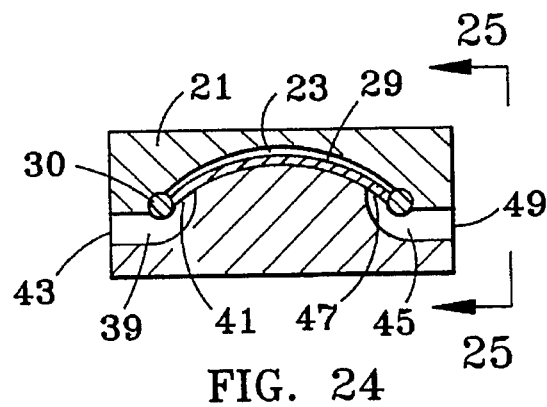
Figure 25:
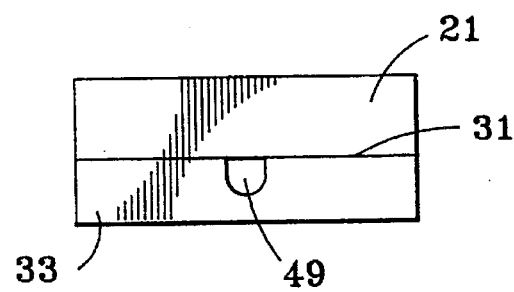

FIGS. 20, 21, 22, and 24 show modifications to inlet channel 39 and outlet channel 45, including the positions of inlet 43 and outlet 49. The outlet can be solely in the cover 21, as an extension of chamber 23, if desired. As shown in FIG. 24, channels can be in the form of a groove.

Figure 22:
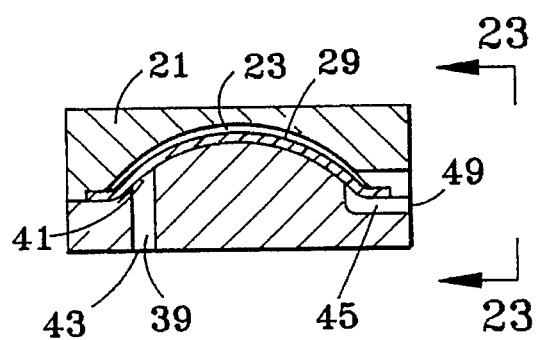
Figure 23:
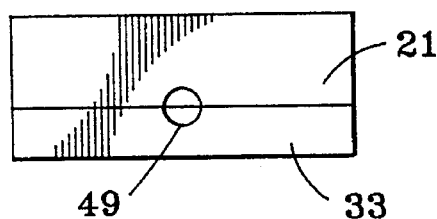
FIGS. 23 and 25 are end views of FIGS. 22 and 24, respectively.

FIG. 22 shows how the outlet channel 45 can be an extension of expansion space 23.

All of the above sheath valves operate in the manner as described above for FIGS. 1 and 2. That is, liquid carried by a container will pass through the valve when relative pressure is applied to the liquid. This pressure causes the liquid entering through inlet channel 39 to press against the membrane 29 at the point of interface of channel and membrane. This lifts the membrane (against the membrane tension) into expansion area 23 sufficiently such that the liquid flows between the membrane 29 and the valve platform 33 to the outlet channel 45. It then flows out that outlet channel. When the applied pressure on the liquid ceases, the tension on the membrane causes the membrane to again press tightly against the sheath end 41 of the inlet channel 39 and the sheath end 47 of the outlet channel 45, sealing them. Liquid no longer flows in either direction; and the container contents are sealed against any noncoerced contamination entering the container through the valve.

I claim:

1. A sheath valve, said sheath valve including a valve platform having a convex surface, said valve platform having a peripheral seat extending around and enclosing said convex surface, an inlet channel and an outlet channel in said valve platform, said inlet channel leading to an inlet opening in said convex surface and said outlet channel leading to an outlet opening in said convex surface with said inlet and outlet openings being spaced from one another, a normally planar imperforate elastomeric membrane positioning over said convex surface and said peripheral seat of said valve platform, a cover for said convex surface of said valve platform having a surface complementary to and spaced from said membrane forming an expansion chamber, said cover having a peripheral cover shoulder complementary to said peripheral seat of said valve platform and mating with and fixed to said peripheral seat with said membrane being sealed therebetween said membrane being secured in tension and taut against said convex surface and over said inlet opening and outlet opening, whereby liquid can flow from said inlet channel to said outlet channel only when sufficient pressure acts on said membrane to overcome the tension on said membrane and cause said membrane to expand into said expansion chamber.

2. A sheath valve as set forth in claim 1 in which said convex surface and said complementary surface have a line of common contact outside of said expansion chamber, and said elastomeric membrane is held between said surfaces along said line of contact.

3. A sheath valve as set forth in claim 2 in which said line of common contact provides the tension acting on said membrane.

4. A sheath valve as set forth in claim 1 in which at least one of said channels is a groove in said convex surfaces.

5. A sheath valve as set forth in claim 1 in which said elastomeric membrane has a peripheral bead, and said convex surface and/or said complementary surface has a recess therein to receive said bead.

6. A sheath valve as set forth in claim 1 in which said elastomeric membrane has a peripheral bead therearound, whereby the tension is caused by interaction of said bead with said convex surface and said complementary surface.

7. A sheath valve as set forth in claim 1 in which one of said convex and complementary surfaces includes a peripheral ridge to receive said elastomeric membrane and the other of said surfaces includes a peripheral complementary recess to receive said elastomeric membrane.

8. A sheath valve as set forth in claim 1 in which said convex surface is arcuate.

9. A sheath valve as set forth in claim 1 in which said convex surface is substantially quasi-spherical.

10. A sheath valve as set forth in claim 1 in which said convex surface is substantially elliptical.

11. A sheath valve, said sheath valve including a valve platform having a convex platform inner surface and a peripheral seat extending around and enclosing said convex surface, said valve platform having at least one channel for liquid, said channel leading through said platform to said platform inner surface, a normally planar imperforate elastomeric membrane positioned over said platform inner surface and said peripheral seat of said valve platform, a cover for said valve platform having a cover inner surface facing and spaced from said membrane positioned over said platform inner surface, said cover having a peripheral cover shoulder mating with and fixed to said peripheral seat with said membrane being sealed therebetween whereby liquid flow occurs only on one side of said membrane.

12. A sheath valve as set forth in claim 11 in which said valve platform and said cover are hermetically secured together.

13. A sheath valve as set forth in claim 11 in which said cover inner surface includes an expansion chamber.

14. A sheath valve as set forth in claim 13 in which said expansion chamber includes an outlet channel.

15. A sheath valve as set forth in claim 11 in which said at least one channel is positioned to running abutting said elastomeric membrane.

16. A sheath valve as set forth in claim 11 in which said elastomeric membrane has a peripheral bead therearound, and at least one of said platform and cover inner surfaces includes a recess to receive said bead.

17. A sheath valve as set forth in claim 16 in which said peripheral bead provides at least part of the tension on said membrane.

18. A sheath valve as set forth in claim 11 in which one of said platform and cover inner surfaces includes a peripheral ridge to receive said elastomeric membrane and the other of said surface includes a peripheral complementary recess to receive said elastomeric membrane.

19. A sheath valve as set forth in claim 11 in which said cover inner surface is a concave surface.

20. A sheath valve as set forth in claim 19 in which said convex surface and said concave surface have a common line of contact, and said elastomeric membrane is held between said surfaces along said line of contact.

21. A sheath valve as set forth in claim 20 in which said common line of contact provides the tension acting on said membrane.

22. A sheath valve as set forth in claim 11 in which said platform inner surface includes a convex area running peripherally thereof and said cover inner surface includes a conical surface positioned to abut against said convex area and to thereby seal said elastomeric membrane between said convex area and said conical surface.

23. A sheath valve as set forth in claim 19 in which said convex surface is arcuate.

24. A sheath valve as set forth in claim 19 in which said convex surface is substantially quasi-spherical.

25. A sheath valve as set forth in claim 19 in which said convex surface is substantially elliptical.

26. A sheath valve as set forth in claim 11 including at least two said channels in said valve platform.

* * * * *